United States Patent Office 3,110,720
Patented Nov. 12, 1963

3,110,720
PROCESS FOR PRODUCING CYCLIC DIORGANO-SILOXANES FROM DIORGANODIHALOSILANES AND ALKALI AND ALKALI EARTH METAL OXIDES AND CARBONATES
Roscoe A. Pike, Grand Island, N.Y., assignor to Union Carbide Corporation, a corporation of New York
No Drawing. Filed Nov. 1, 1960, Ser. No. 66,427
25 Claims. (Cl. 260—448.2)

This invention relates to a process for producing organosilicon compounds. More particularly, this invention relates to a process for producing cyclic diorganosiloxanes from diorganodihalosilanes.

Cyclic diorganosiloxanes are used extensively in producing diorganopolysiloxane gums which can be converted to silicone elastomers that have outstanding thermal stability and electrical properties. Such cyclic diorganosiloxanes are usually produced from diorganodihalosilanes. However, the processes provided to date for producing cyclic diorganosiloxanes from diorganodihalosilanes suffer from various disadvantages.

By way of illustration, one known process for producing cyclic diorganosiloxanes involves, as a first step, adding a solution of a diorganodihalosilane to an agitated mixture of ice and an organic solvent to produce a hydrolyzate consisting of diorganosilanediols, partially condensed diorganosiloxanes and fully condensed diorganosiloxanes. Such hydrolyzates are then heated to condense all of the silicon-bonded hydroxyl groups therein, an equilibration catalyst is added and the mixture so formed is heated and the desired cyclic diorganosiloxanes are separated as a distillate. This process for producing cyclic diorganosiloxanes is time consuming, involves several steps, involves the production of a corrosive hydrogen halide as byproduct, invloves the use of flammable and volatile organic solvents and is not adaptable to continuous operation.

As a further illustration, another known process for producing cyclic diorganosiloxanes involves reacting a diorganodihaolsilane and an alkali metal bicarbonate. This process is unattractive since corrosive hydrogen halide is produced as a by-product.

As still further illustrations, other known processes for producing cyclic diorganosiloxanes involve reacting a diorganodihalosilane and metal oxides, particularly aluminum oxide and iron oxide. Such processes produce metal halides as by-products (i.e. aluminum trihalide and iron halides) which catalyze the cleavage of silicon-bonded phenyl groups and hence such processes are not suitable for producing cyclic phenylsiloxanes from phenyldihalosilanes. In addition, when aluminum oxide is the metal oxide reactant in such processes, excessively high temperatures (e.g. temperatures up to 700° C.) are required. Moreover, when the metal halide produced as a by-product in such processes is iron halide, the iron halide catalyzes undesirable equilibrations wherein the desired cyclic diorganosiloxanes are converted to high molecular weight linear diorganopolysiloxanes. Hence the yield of the desired cyclic diorganosiloxanes is reduced. This latter undesirable reduction of the yields of the desired cyclic diorganosiloxanes is also observed when the other above-described known processes that involve the production of a hydrogen halide as a by-product are conducted in reaction vessels composed of ferrous metals. In such case, the hydrogen halide formed as a by-product reacts with the iron of the vessel to produce an iron halide which catalyzes undesirable equilibration reactions.

It is an object of this invention to provide a process for producing cyclic diorganosiloxanes from diorganodihalosilanes which is not lengthy, which requires relatively few process steps and which is adaptable for continuous operation.

Another object of this invention is to provide a process for producing cyclic diorganosiloxanes from diorganodihalosilanes wherein no corrosive hydrogen halide is produced as a by-product and wherein no flammable and volatile solvents are required.

A further object of this invention is to provide a process for producing cyclic diorganosiloxanes from diorganodihalosilanes which does not require excessively high temperatures and which does not involve the production of by-products that catalyze the cleavage of silicon-bonded phenyl groups or that catalyze the equilibration of the desired cyclic diorganosiloxanes.

This invention provides a process for producing cyclic diorganosiloxanes which involves forming a reaction mixture containing (1) a diorganodihalosilane, wherein the organo groups are monovalent hydrocarbon groups having from 0 to 1 cyano or carbohydrocarbonoxy groups as substituents, and (2) an alkali or alkali earth metal oxide or carbonate and maintaining the reaction mixture at a temperature of at least 200° C. in the absence of water and any organic solvent to produce a cyclic diorganosiloxane.

The process of this invention involves either of two reactions which can be illustrated, in the instances wherein dimethyldichlorosilane and calcium oxide or carbonate are employed as reactants, by the following equations:

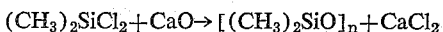
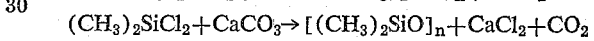

$(CH_3)_2SiCl_2 + CaO \rightarrow [(CH_3)_2SiO]_n + CaCl_2$ $(CH_3)_2SiCl_2 + CaCO_3 \rightarrow [(CH_3)_2SiO]_n + CaCl_2 + CO_2$ wherein $n$ has a value from 3 to 7 inclusive.

Illustrative of the organo groups present in the diorganodihalosilanes employed as starting materials in this invention are the following unsubstituted monovalent hydrocarbon groups: the linear alkyl groups (for example the methyl, ethyl, propyl, butyl and octadecyl groups), the cyclic alkyl groups (for example the cyclohexyl and cyclopentyl groups), the linear alkenyl groups (for example the vinyl and allyl groups), the cyclic alkenyl groups (for example the cyclopentenyl and the cyclohexenyl groups), the aryl groups (for example the phenyl and naphthyl groups), the alkaryl groups (for example the tolyl group) and the aralkyl groups (for example the benzyl and beta-phenylethyl groups). Also illustrative of the organo groups present in the diorganodihalosilanes are the following substituted monovalent hydrocarbon groups: the cyano-substituted monovalent hydrocarbon groups (for example, the cyanoalkyl groups [e.g. the beta-cyanoethyl, gamma-cyanopropyl and delta-cyanobutyl groups] and cyanoaryl groups [e.g. the ortho-cyanophenyl and the para-cyanophenyl groups]) and the carbohydrocarbonoxy-substituted monovalent hydrocarbon groups (for example, the carbalkoxyalkyl groups [e.g. the beta-carbethoxyethyl and gamma-carbopropoxypropyl groups] and the carbaroxyalkyl groups [for example the beta-carbophenoxyethyl and gamma - carbophenoxypropyl groups]). The phrase "monovalent hydrocarbon group" is employed herein in the generic sense to include both the substituted and the unsubstituted monovalent hydrocarbon groups.

Preferably the diorganodihalosilane starting material is a diorganodichlorosilane wherein the organo group is a substituted or an unsubstituted monovalent hydrocarbon group (particularly a substituted or an unsubstituted alkyl group) containing from 1 to 10 carbon atoms.

Illustrative of the diorganodihalosilanes employed as starting materials in this invention are
dimethyldichlorosilane,
diethyldibromosilane,
diphenyldichlorosilane, phenyl(methyl)dichlorosilane,
methyl(vinyl)dichlorosilane,
ethyl(vinyl)dibromosilane,
beta-cyanoethyl(methyl)dichlorosilane,
gamma-cyanopropyl(methyl)dichlorosilane,
gamma-cyanoisobutyl(phenyl)dibromosilane,
beta-carbethoxyethyl(methyl)dichlorosilane,
gamma-carbethoxypropyl(methyl)dichlorosilane and
delta-carbophenoxybutyl(phenyl)dibromosilane.

The alkali and alkali earth metal oxides and carbonates employed as reactants in this invention include calcium oxide and carbonate, sodium oxide and carbonate, potassium oxide and carbonate, barium oxide and carbonate and lithium oxide and carbonate. The preferred reactants are calcium oxide, calcium carbonate and sodium carbonate.

The cyclic diorganosiloxanes produced in the process of this invention are composed of diorganosiloxane groups wherein the organo groups are the various unsubstituted and substituted monovalent hydrocarbon groups described above. These cyclic diorganosiloxanes generally have from 3 to 7 or more diorganosiloxane groups per molecule. The diorganosiloxane groups in these cyclic diorganosiloxanes are all the same when a single diorganodichlorosilane is employed as reactant. However, when mixtures of diorganodichlorosilanes are employed as reactants, cyclic diorganosiloxanes are produced containing more than one type of diorganosiloxane group in any given molecule. By way of illustration, when a mixture of one mole of dimethyldichlorosilane and one mole of ethylvinyldichlorosilane is employed as the reactant, cyclic diorganosiloxanes are produced wherein each siloxane molecule contains at least one dimethylsiloxane group and at least one ethylvinylsiloxane group.

Illustrative of the cyclic diorganosiloxanes produced in the process of this invention are the cyclic dihydrocarbonsiloxanes, e.g. the dimethylsiloxane, diethylsiloxane, diphenylsiloxane, phenyl(methyl)siloxane, methyl(ethyl)siloxane, methyl(vinyl)siloxane and ethyl(vinyl)siloxane cyclic trimers and tetramers); the cyclic cyanohydrocarbon(hydrocarbon)siloxanes (e.g. the beta-cyanoethyl(methyl)siloxane, gamma-cyanopropyl(methyl)siloxane and gamma-cyanoisobutyl(phenyl)siloxane cyclic trimers and tetramers) and the cyclic carbohydrocarbonoxy(hydrocarbon)siloxanes (e.g. the beta-carbethoxyethyl(methyl)siloxane, gamma-carbethoxypropyl(methyl)siloxane and the delta-carbopropoxybutyl(phenyl)siloxane cyclic trimers and tetramers).

A temperature of at least 200° C. is maintained during the process of this invention. The volatility of the diorganodihalosilane employed as a starting material, the thermal sensitivity of the diorganodihalosilane employed as reactant, the particular metal whose oxide or carbonate is employed as reactant and similar considerations will influence the particular temperature employed. Generally, temperatures from 200° C. to 450° C. are useful. When an alkali or alkali earth metal oxide is employed as reactant, temperatures from 200° C. to 300° C. are usually preferred and, when an alkali or alkali earth metal carbonate is employed as reactant, temperatures from 300° C. to 450° C. are usually preferred. At temperatures below 200° C. substantially no reaction occurs between the diorganodihalosilanes and the metal oxides and carbonates. At temperatures above 450° C., excessive amounts of side reactions [e.g. oxidation] occur.

The process of this invention can be conducted in any convenient manner (e.g. in a batchwise manner or in a continuous manner).

When the process of this invention is conducted in a batchwise manner, it is convenient to add the diorganodihalosilane in small amounts to a relatively large amount of the metal oxide or carbonate which is maintained at a temperaure of at least 200° C. At the conclusion of the reaction, the cyclic diorganosiloxanes can be removed from any excess metal oxide or carbonate, any excess diorganodihalosilane and the metal halide produced as a by-product by any suitable means. Preferably, the cyclic diorganosiloxanes are separated from such oxides, carbonates and halides by extraction with a suitable solvent. Suitable solvents include aliphatic hydrocarbons (such as heptane and octane), aromatic hydrocarbons (such as benzene and toluene) and ethers (such as diethyl ether and dimethyl ether of ethylene glycol). After the cyclic diorganosiloxanes have been extracted, they can be separated from the solvent and any excess diorganodihalosilane by any convenient means (such as by fractional distillation).

Preferably the process of this invention is conducted in a continuous manner. Thus the diorganodihalosilane in the gaseous state can be passed through a porous bed containing a large excess of a metal oxide or carbonate that is maintained at a temperature above the boiling point of the diorganodihalosilane and the cyclic diorganosiloxanes to be produced, provided that the temperature is at least 200° C. The gaseous cyclic diorganosiloxanes are withdrawn from the side of the bed opposite the side at which the gaseous diorganodihalosilane is introduced. A suitable method is to provide a heated tubular container within which is placed the porous bed of the metal oxide or carbonate. The diorganodihalosilane can be continuously introduced into one end of the container and gaseous cyclic diorganosiloxanes can be continuously withdrawn from the other end. In this manner, the cyclic diorganosiloxanes can be produced continuously in a single step.

The relative amount of the diorganodihalosilane and the alkali or alkali earth metal oxide or carbonate employed in the process of this invention is not narrowly critical. Preferably, a large excess of the metal oxide or carbonate is employed to insure complete reaction of the more expensive diorganodihalosilane. Stoichiometric amounts, or other amounts of the reactants, can be employed, if desired.

The process of this invention is conducted in the absence of water. The presence of water is undesirable since it reacts with the diorganodihalosilanes to produce corrosive hydrogen halides.

The process of this invention is conducted in the absence of an organic solvent. Consequently the additional cost involved in employing such solvents and the danger inherent in the volatile and inflammable nature of such solvents are avoided. The production of good yields of cyclic diorganosiloxanes by the process of this invention in the absence of a solvent, even when operated batchwise, is remarkable in view of the fact that such solvents are essential to the production of good yields of cyclic diorganosiloxanes by conventional batch processes (e.g. by the base-catalyzed depolymerization of diorganopolysiloxanes).

The process of this invention can be conducted at any desired pressure (e.g. at atmospheric pressure or at pressures above or below atmospheric pressure). Pressures above atmospheric pressure are particularly useful in the continuous operation of the process in order to force the diorganodihalosilane vapor through a bed of the metal oxide or carbonate.

The process of this invention can be conducted in reactors made from any conventional material of construction (e.g. glass or ferrous metals). Since no hydrogen halide is produced as a by-product in the process of this invention, there is no danger of any reaction of metallic materials of construction (e.g. ferrous metals) to produce metal halides (e.g. iron halides) which catalyze undesirable side reactions. Moreover, since excessively high temperatures are not required in the process of this invention (e.g. temperatures as high as 700° C.), reactors composed of refractory materials (e.g. ceramics) are not essential although such materials can be used if desired.

The cyclic diorganosiloxanes produced by the process of this invention can be employed as such as high temperature hydraulic fluids. These cyclic diorganosiloxanes can be also employed in producing silicone gums which in turn can be converted to silicone elastomers by known processes.

In all of the examples presented below the apparatus used was composed of glass and the alkali or alkali earth metal oxide or carbonate was present in a large molar excess (i.e. at least four moles per mole of the silane reactant) unless the exact amount is indicated. As used in the examples, the term "moles" denotes gram moles. In all of the examples anhydrous conditions were maintained.

The following examples illustrate the present invention.

The following apparatus and procedure were used in Examples I, III and IV.

The hot tube reactor consisting of a glass column that was 60 centimeters long and 25 millimeters in internal diameter was mounted in a vertical position and heated by means of a Nichrome wire column heater. There was a porous plug in the bottom of the column. The column was packed to a depth of 40 centimeters with sodium carbonate, calcium carbonate or calcium oxide upon which was laid a layer of glass beads 4 centimeters deep. A 250 milliliter dropping funnel with side arm for pressure equilization and an adapter with a tubing connection was mounted at the top of the column. The tubing connection was fixed to a nitrogen line which contained a mercury pressure vent maintaining a column of 6.1 inches of mercury. To the bottom outlet of the column was attached a 250 milliliter round bottom distilling flask (receiver) with vent tube leading to a solid carbon dioxide-acetone cold trap.

Dimethyldichlorosilane was added dropwise to the top of the column and vaporized on the glass bead packing. The nitrogen flow carried the vaporized reactant through the sodium carbonate, calcium carbonate or calcium oxide bed. The condensable effluent from the column was collected in the bottom flask which was cooled in a water-ice bath. The exhaust gas passed through the trap that was cooled with solid carbon dioxide and was carried into an air evacuation system. A pressure drop of three pounds per square inch through the column will cause a pressure valve to release and therefore prevent danger due to plugging.

*Example I*

Dimethyldichlorosilane (0.5 mole) was charged to the dropping funnel and added dropwise to the column containing sodium carbonate over a four hour period while the column was maintained at 440° C. Crystals and a light yellow liquid were noted in the receiver throughout the addition. The receiver was cooled with argon and the liquid and solid removed from the receiver. No characteristic order indicating the presence of SiCl groups was noticed. The combined weight of the liquid and the solid in both the receiver and the trap was 36.2 grams. The liquid was identified by its index of refraction ($n_D^{25}$ 1.3936) as predominantly dimethylsiloxane cyclic tetramer, $[(CH_3)_2SiO]_4$, theoretical $n_D^{25}$ 1.3939, The solid was recrystallized from n-pentane and was found to have a melting point of 62–63° C., indicating that it was a mixture of dimethylsiloxane cyclic trimer and tetramer in a 1 to 4 weight ratio. The yield of cyclic dimethylsiloxanes was 97.9%.

The cyclic dimethylsiloxanes were purified by passing them through a heated zeolitic molecular sieve and the siloxanes so purified were converted to a silicone gum by adding a potassium catalyst and heating for 0.5 hour at 150° C.

*Example II*

Gamma - cyanopropyl(methyl)dichlorosilane (0.25 mole) and calcium oxide (1.0 mole) were charged to a nitrogen sparged 500 milliliter distilling flask fitted with a 40 centimeter Vigreux column and still head. The flask was heated at 260° C. for 2 hours, the flask cooled to room temperature and contents extracted with dry $CH_3OCH_2CH_2OCH_3$ which was filtered and evaporated leaving a dark brown oil (no characteristic odor of SiCl groups). The oil was extracted with anhydrous diethyl ether, and the ether stripped under reduced pressure leaving a clear oil which was identified by its refractive index ($n_D^{25}$) as gamma-cyanopropyl(methyl)siloxane cyclic tetramer, $[NC(CH_2)_3Si(CH_3)O]_4$.

*Example III*

Dimethyldichlorosilane (0.5 mole) was charged to the funnel and added dropwise to a bed of calcium carbonate over a period of 5.25 hours. The bed was maintained at 450° C. Solid and light yellow liquid were obtained in the receiver. The product in the receiver was neutralized with ammonia and extracted with anhydrous ethyl ether. Upon stripping of the solvent, a mixture of white crystals, that were identified as dimethylsiloxane cyclic trimer, $[(CH_3)_2SiO]_3$, was obtained.

*Example IV*

Dimethyldichlorosilane (0.5 mole) was added slowly to a bed of hot calcium oxide that was maintained at 255° C. A liquid was obtained in the receiver. No odor characteristic of Si—Cl groups was noticed. The refractive index $n_D^{25}$ of the liquid was 1.3984. Infrared spectrum of the liquid showed it to be a mixture of dimethyl siloxane cyclic trimer and tetramer.

*Example V*

Beta - carbethoxypropyl(methyl)dichlorosilane (0.25 mole) and anhydrous sodium carbonate (1.0 mole) were charged to a nitrogen sparged 500 milliliter flask fitted with 40 centimeters Vigreux column and still head. The column was heated at 210° C.–275° C. for 1 hour and gas was evolved. The contents of the flask was extracted with anhydrous ether, and the ether was evaporated leaving an amber-colored oil having an index of refraction ($n_D^{25}$) of 1.4415. This oil was identified by infra-red analysis beta-carbethoxypropylmethylsiloxane cyclic tetramer,

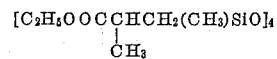

*Example VI*

Diphenyldichlorosilane (0.25 mole) and anhydrous sodium carbonate (1.0 mole) were charged to a 500 milliliter distilling flask fitted with a 40 centimeter Vigreux column, a still head, and a gas bubbler. The flask was heated from 200 to 325° C. over a period of 1.5 hours and gas evolved. Upon cooling to room temperature the solid in the flask was extracted with anhydrous diethyl ether to remove unreacted chlorosilane. The solid in the flask was further extracted with 100 milliliters hot toluene which was then chilled and crystals of diphenylsiloxane cyclic tetramer were formed which were identified by their melting point.

*Example VII*

Methyl(vinyl)dichlorosilane (0.2 mole) was added dropwise over a 2-hour period to a bed of sodium carbonate that was maintained at 364° C. to 372° C. in a flask that was fitted with a distillation column and a receiver. A light yellow liquid was collected in the receiver. This liquid was identified by infra-red analysis as a mixture of methyl(vinyl)siloxane cyclic trimer and tetramer (i.e. $[CH_3Si(CH=CH_2)O]_3$ and

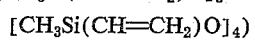

What is claimed is:

1. A process for producing cyclic diorganosiloxanes which involves forming a reaction mixture containing (1) a diorganodihalosilane, wherein the organo groups are monovalent hydrocarbon groups having from 0 to 1 cyano group and from 0 to 1 carbohydrocarbonoxy group as substituents, and (2) an inorganic compound selected from the group consisting of the alkali metal oxides, alkali metal carbonates and alkali earth metal carbonates and maintaining the mixture at a temperature of at least 200° C. in the absence of water and any organic solvent to produce cyclic diorganosiloxanes.

2. The process of claim 1 wherein the diorganodihalosilane is a diorganodichlorosilane.

3. The process of claim 1 wherein the inorganic compound is an alkali metal carbonate.

4. The process of claim 1 wherein the inorganic compound is an alkali metal oxide.

5. The process of claim 1 wherein the inorganic compound is an alkali earth metal carbonate.

6. The process of claim 1 wherein each organo group is a methyl group.

7. A process for producing cyclic dihydrocarbonsiloxanes which comprises forming a reaction mixture of (1) a dihydrocarbondichlorosilane wherein each hydrocarbon group is a monovalent group that contains from 1 to 10 carbon atoms, and (2) an alkali earth metal carbonate and maintaining the reaction mixture at a temperature from 300° C. to 450° C. in the absence of water and any organic solvent to produce cyclic dihydrocarbonsiloxanes.

8. A process for producing cyclic dihydrocarbonsiloxanes which comprises forming a reaction mixture of (1) a dihydrocarbondichlorosilane wherein each hydrocarbon group is a monovalent group that contains from 1 to 10 carbon atoms, and (2) an alkali metal oxide and maintaining the reaction mixture at a temperature from 200° C. to 300° C. in the absence of water and any organic solvent to produce cyclic dihydrocarbonsiloxanes.

9. A process for producing cyclic dihydrocarbonsiloxanes which comprises forming a reaction mixture of (1) a dihydrocarbondichlorosilane wherein each hydrocarbon group is a monovalent group that contains from 1 to 10 carbon atoms, and (2) an alkali metal carbonate and maintaining the reaction mixture at a temperature from 300° C. to 450° C. in the absence of water and any organic solvent to produce cyclic dihydrocarbonsiloxanes.

10. The process for producing cyclic cyanoalkyl(alkyl)siloxanes which comprises forming a reaction mixture of (1) a cyanoalkyl(alkyl)dichlorosilane wherein each alkyl group contains from 1 to 10 carbon atoms, and (2) an alkali earth metal carbonate and maintaining the reaction mixture at a temperature from 300° C. to 450° C. in the absence of water and any organic solvent to produce cyclic cyanoalkyl(alkyl)siloxanes.

11. The process for producing cyclic cyanoalkyl(alkyl)siloxanes which comprises forming a reaction mixture of (1) a cyanoalkyl(alkyl)dichlorosilane wherein each alkyl group contains from 1 to 10 carbon atoms, and (2) an alkali metal oxide and maintaining the reaction mixture at a temperature from 200° C. to 300° C. in the absence of water and any organic solvent to produce cyclic cyanoalkyl(alkyl)siloxanes.

12. The process for producing cyclic cyanoalkyl(alkyl)siloxanes which comprises forming a reaction mixture of (1) a cyanoalkyl(alkyl)dichlorosilane wherein each alkyl group contains from 1 to 10 carbon atoms, and (2) an alkali metal carbonate and maintaining the reaction mixture at a temperature from 300° C. to 450° C. in the absence of water and any organic solvent to produce cyclic cyanoalkyl(alkyl)siloxanes.

13. The process for producing cyclic carbalkoxyalkyl(alkyl)siloxanes which comprises forming a reaction mixture of (1) a carbalkoxyalkyl(alkyl)dichlorosilane wherein each alkyl group contains from 1 to 10 carbon atoms, and (2) an alkali earth metal carbonate and maintaining the reaction mixture at a temperature from 300° C. to 450° C. in the absence of water and any organic solvent to produce cyclic carbalkoxyalkyl(alkyl)siloxanes.

14. The process for producing cyclic carbaloxyalkyl(alkyl)siloxanes which comprises forming a reaction mixture of (1) a carbalkoxyalkyl(alkyl)dichlorosilane wherein each alkyl group contains from 1 to 10 carbon atoms, and (2) alkali metal oxide and maintaining the reaction mixture at a temperature from 200° C. to 300° C. in the absence of water and any organic solvent to produce cyclic carbalkoxyalkyl(alkyl)siloxanes.

15. The process for producing cyclic carbalkoxyalkyl(alkyl)siloxanes which comprises forming a reaction mixture of (1) a carbalkoxyalkyl(alkyl)dichlorosilane wherein each alkyl group contains from 1 to 10 carbon atoms, and (2) an alkali metal carbonate and maintaining the reaction mixture at a temperature from 300° C. to 450° C. in the absence of water and any organic solvent to produce cyclic carbalkoxyalkyl(alkyl)siloxanes.

16. A process for producing cyclic dialkylsiloxanes which comprises forming a reaction mixture of (1) a dialkyldichlorosilane, wherein each alkyl group contains from 1 to 10 carbon atoms, and (2) an alkali earth metal carbonate and maintaining the reaction mixture at a temperature from 300° C. to 450° C. in the absence of water and any organic solvent to produce cyclic dialkylsiloxanes.

17. A process for producing cyclic dialkylsiloxanes which comprises forming a reaction mixture of (1) a dialkyldichlorosilane, wherein each alkyl group contains from 1 to 10 carbon atoms, and (2) an alkali metal oxide and maintaining the reaction mixture at a temperature from 200° C. to 300° C. in the absence of water and any organic solvent to produce cyclic dialkylsiloxanes.

18. A process for producing cyclic dialkylsiloxanes which comprises forming a reaction mixture of (1) a dialkyldichlorosilane, wherein each alkyl group contains from 1 to 10 carbon atoms, and (2) an alkali metal carbonate and maintaining the reaction mixture at a temperature from 300° C. to 450° C. in the absence of water and any organic solvent to produce cyclic dialkylsiloxanes.

19. A process for producing cyclic diarylsiloxanes which comprises forming a reaction mixture of (1) a diaryldichlorosilane and (2) an alkali earth metal carbonate and maintaining the reaction mixture at a temperature from 300° C. to 450° C. in the absence of water and any organic solvent to produce cyclic diarylsiloxanes.

20. A process for producing cyclic diarylsiloxanes which comprises forming a reaction mixture of (1) a diaryldichlorosilane and (2) an alkali metal oxide and maintaining the reaction mixture at a temperature from 200° C. to 300° C. in the absence of water and any organic solvent to produce cyclic diarylsiloxanes.

21. A process for producing cyclic diarylsiloxanes which comprises forming a reaction mixture of (1) a diaryldichlorosilane and (2) an alkali metal carbonate and maintaining the reaction mixture at a temperature from 300° C. to 450° C. in the absence of water and any organic solvent to produce cyclic diarylsiloxanes.

22. A process for producing cyclic dimethylsiloxanes which comprises forming a reaction mixture containing (1) dimethyldichlorosilane and (2) sodium carbonate and maintaining the reaction mixture at a temperature from 300° C. to 450° C. in the absence of water and any organic solvent to produce cyclic dimethylsiloxanes.

23. A process for producing cyclic beta-carbethoxypropyl(methyl)siloxanes which comprises forming a reaction mixture containing (1) beta-carbethoxypropyl(methyl)dichlorosilane and (2) sodium carbonate and maintaining the reaction mixture at a temperature from 200° C. to 450° C. in the absence of water and any organic solvent to produce cyclic beta-carbethoxypropyl(methyl)siloxanes.

24. A process for producing cyclic diphenylsiloxanes which comprises forming a reaction mixture containing (1) diphenyldichlorosilane and (2) sodium carbonate and maintaining the reaction mixture at a temperature from 200° C. to 450° C. in the absence of water and any organic solvent to produce cyclic diphenylsiloxanes.

25. A process for producing cyclic methyl(vinyl)-siloxanes which comprises forming a reaction mixture containing (1) methyl(vinyl)dichlorosilane and (2) sodium carbonate and maintaining the reaction mixture at a temperature from 300° C. to 450° C. in the absence of water and any organic solvent to produce cyclic methyl-(vinyl)siloxanes.

References Cited in the file of this patent

UNITED STATES PATENTS

| | | |
|---|---|---|
| 2,452,416 | Wright | Oct. 26, 1948 |
| 2,580,852 | Shaw et al. | Jan. 1, 1952 |
| 2,629,725 | Hyde | Feb. 24, 1953 |
| 2,646,441 | Duane | July 21, 1953 |
| 2,744,923 | Duane | May 8, 1956 |

FOREIGN PATENTS

| | | |
|---|---|---|
| 606,301 | Great Britain | Aug. 11, 1948 |